(12) United States Patent
Portyrata et al.

(10) Patent No.: US 6,878,293 B1
(45) Date of Patent: Apr. 12, 2005

(54) AUTOMATIC VALVE ASSEMBLY FOR WATER CIRCULATION SYSTEMS

(76) Inventors: Raymond E. Portyrata, 1580 Ridge Rd., North Haven, CT (US) 06473; Thomas Wallace, 230 Peck Hill Rd., Woodbridge, CT (US) 06525

( * ) Notice: Subject to any disclaimer, the term of this patent is extended or adjusted under 35 U.S.C. 154(b) by 108 days.

(21) Appl. No.: 10/256,161

(22) Filed: Sep. 25, 2002

(51) Int. Cl.[7] .............................................. B01D 24/48
(52) U.S. Cl. .................. 210/793; 210/798; 210/108; 210/278; 210/421; 210/425; 137/106; 137/625.43
(58) Field of Search ................................. 210/421, 425, 210/278, 90, 108, 138, 793, 798; 137/106, 625.43, 119.02, 119.08; 251/61, 50

(56) References Cited

U.S. PATENT DOCUMENTS

| | | |
|---|---|---|
| 60,512 A | 12/1866 | Hayes |
| 110,217 A | 12/1870 | Dougherty |
| 2,184,618 A | 12/1939 | Lawlor |
| 2,434,427 A * | 1/1948 | Muller ..................... 210/102 |
| 2,858,024 A | 12/1958 | Babcock |
| 3,111,486 A | 11/1963 | Soriente |
| 3,138,552 A | 6/1964 | Richards |
| 3,478,883 A | 11/1969 | DeLuca, Jr. |
| 3,491,884 A | 1/1970 | Baker |
| 3,581,895 A | 6/1971 | Howard et al. |
| 3,630,363 A | 12/1971 | Nash et al. |
| 3,834,535 A | 9/1974 | Portyrata |
| 3,948,778 A | 4/1976 | Müller |
| 4,194,975 A | 3/1980 | Baker |
| 4,477,343 A | 10/1984 | Tucker |
| 4,482,461 A | 11/1984 | Hindman et al. |
| 4,549,961 A | 10/1985 | Bellemann et al. |
| 4,564,451 A | 1/1986 | Cohen |
| 4,614,581 A | 9/1986 | Drori |
| 4,736,671 A | 4/1988 | Drori |
| 5,234,605 A | 8/1993 | Reipur et al. |
| 5,484,536 A | 1/1996 | Yamaguchi et al. |
| 5,505,844 A | 4/1996 | Porter |
| 5,730,861 A | 3/1998 | Sterghos et al. |
| 5,744,034 A | 4/1998 | Clapham et al. |
| 5,830,347 A | 11/1998 | Vollmer |
| 5,906,751 A | 5/1999 | Parker |
| 6,056,873 A | 5/2000 | Hartley et al. |
| 6,200,467 B1 | 3/2001 | Nagaoka |

* cited by examiner

Primary Examiner—Terry K. Cecil
(74) Attorney, Agent, or Firm—DeLio & Peterson, LLC; John J. Tomaszewski (57) ABSTRACT

A filtration and backwash system for a water source such as a swimming pool is provided including a fluid source, a pump, a filter and a specially designed five-port valve which is easily adaptable for automatic use in the filtration mode and in the backwash mode. The valve uses a rotatable deflector plate which is positioned to divert the fluid in one direction in the valve for the filtration process and is positioned to divert the fluid in the other direction in the valve for the backwash process. An automatic timing device is also provided and is particularly suitable for use in conjunction with the valve whereby no manual intervention or electronic means is needed to change the valve from the filtering mode to the backwash mode or vice versa. The timing device automatically senses the pressure buildup in the filtration system due to accumulation of debris in the filter and automatically changes the valve from the filtration mode to backwash mode when a predetermined system pressure is exceeded. The timing device then gradually returns the valve to its initial filtering position to continue the filtering process.

10 Claims, 8 Drawing Sheets

AUTOMATIC VALVE ASSEMBLY FOR WATER CIRCULATION SYSTEMS

BACKGROUND OF THE INVENTION

1. Field of the Invention

The present invention relates to a valve assembly and timing device for fluid circulation systems, and more particularly, to an automatic valve assembly used in a wimming pool to control filtering and filter backwash flow by a single valve.

2. Description of Related Art

Filtration systems are common in the field in which debris in the fluid is collected in a filter such as a sand bed from the fluid, typically water, passing through the filter. The filtered water or fluid is returned to its source, such as a pool, reservoir, cooling system, reactor, or the like. It is also common to employ a means for reversing the flow through the filter to backwash-accumulated debris from the filter device or filter medium to a waste receptacle to remove the debris or waste from the filtering system. The present description will be directed to a filtration system for a swimming pool including means for backwashing the filtration system although it will be understood to those skilled in the art that the valve and method and apparatus of the invention can be used for other fluid control systems.

Known in the field are filtration systems having automatic filter backwash mechanisms which are mechanically operated and pressure driven. These devices may include an automatic timing feature to reset the valve after a backwash cycle. One such filtering system for use in irrigation devices, such as sprinklers, or sprayers, discloses a backwash process which includes a fluid operated timing device having a piston and a chamber. The timer is positioned in a port of a cylindrical filter housing. Other devices employ relatively large structures to provide the timing feature. A known device includes upper and lower tipping trays mounted above the filter having a pressure-operated valve which allows an upper tipping tray to fill. As the pressure exceeds the valve's preset operating pressure, the upper tray eventually tips downwardly operating a backwash valve. After the upper tray tips down, the lower tray tips up and begins to fill until it tips to the down position and restores the backwash valve to the original position. A disadvantage of this system is the relatively large and cumbersome design.

Also known in the art are backwash systems having a four-port valve body and a manually operated redirection plate. A disadvantage of a manually operated redirection plate is that it requires the supervision and intervention of a person to activate the backwash system. In the absence of human intervention for any number of reasons, the backwash system can remain un-activated resulting in clogging of the filtration system and/or dirty water being recycled to the swimming pool.

Known backwash systems may include a five-port valve body having a double-headed valve element and a rotary backwash plate. Typically, the double-headed valve element as well as the rotary backwash plate is actuated using a motor, or a motor-driven cam to move in its designed direction. Other backwash filter systems may use a double-headed valve element moved by mechanisms such as a fluid-operated piston requiring a power source. A disadvantage of these type that they are not automated, and require power be supplied and motor driven mechanisms to move the valve element. Thus, human intervention is required to activate the power, and the associated motor itself requires maintenance and repair. The expense to run these type systems, therefore, will be greater than an automated valve system which consumes little or no power or human intervention.

Bearing in mind the problems and deficiencies of the prior art, it is therefore an object of the present invention to provide an automatic valve apparatus which provides multiple ports for selectively directing fluids passing through the valve.

It is yet another object of the present invention to provide an automatic valve apparatus which uses a fluid pressure timing device and method for using the apparatus for timing the filtering and backwashing process.

An additional object of the present invention provides an automatic timing device which is preferably used in conjunction with the valve of the invention.

Another object of the present invention provides a filtration and backwash system.

Still other objects and advantages of the invention will in part be obvious and will in part be apparent from the specification.

SUMMARY OF THE INVENTION

The above and other objects, which will be apparent to those skilled in art, are achieved in the present invention which is directed in one aspect to a valve assembly comprising:

an elongated valve body having a longitudinal axis and curved central portion, an inlet port in the central portion, a left first port, a left second port, a right first port and a right second port, the left first port and right first port being opposed;

a rotatable deflector plate in the central portion of the valve body having a rotating vertical axis perpendicular to the longitudinal axis of the valve body and the periphery of the deflector plate is in fluid tight communication with the wall of the curved central portion, the deflector plate rotatable to direct a fluid entering the inlet port toward the left first port and left second port or to the right first port and right second port;

an elongated piston having a left end cap and a right end cap freely axially slidable along the longitudinal axis of the valve body and configured to close the left second port or right second port depending on the position of the deflector plate;

wherein when the deflector plate is positioned to divert fluid to the right, the right first port is open and the right cap closes the right second port and the left first port and left second port are open and when the deflector plate is positioned to direct flow to the left, the left second port is closed and the left first port is open and both the right first port and right second port are open.

In another aspect of the invention a filtration system is provided comprising:

a fluid source;

a pump;

a filter;

a valve comprising:

an elongated valve body having a longitudinal axis and curved central portion, an inlet port in the central portion, a left first port, a left second port, a right first port and a right second port, the left first port and right first port being opposed;

a rotatable deflector plate in the central portion of the valve body having a rotating vertical axis perpendicular to the longitudinal axis of the valve body and the periphery of the deflector plate is in fluid tight communication with the wall of the curved central portion, the deflector plate rotatable to direct a fluid entering the inlet port toward the left first port and left second port or to the right first port and right second port;

an elongated piston having a left end cap and a right end cap freely axially slidable along the longitudinal axis of the valve body and configured to close the left second port or right second port depending on the position of the deflector plate;

wherein when the deflector plate is positioned to divert fluid to the right, the right first port is open and the right cap closes the right second port and the left first port and left second port are open and when the deflector plate is positioned to direct flow to the left, the left second port is closed and the left first port is open and both the right first port and right second port are open;

wherein when filtering of the fluid is desired, fluid entering the inlet port of the valve is directed to the filter through the first right port and from the filter back to the water source through the first left port and second left port and, in the backwash mode, the deflector plate is rotated and the fluid is directed to the other side of the filter through the first left port and out from the filter into the valve through the first right port and out to waste through the second right port.

In a further aspect of the invention a method of filtering a fluid through a filtration system is provided comprising the steps of:

providing a fluid source to be filtered;
providing a pump;
providing a filter;
providing a valve comprising:
  an elongated valve body having a longitudinal axis and curved central portion, an inlet port in the central portion, a left first port, a left second port, a right first port and a right second port, the left first port and right first port being opposed;
  a rotatable deflector plate in the central portion of the valve body having a vertical rotating axis perpendicular to the longitudinal axis of the valve body and the periphery of the deflector plate is in fluid tight communication with the wall of the curved central portion, the deflector plate rotatable to direct a fluid entering the inlet port toward the left first port and left second port or to the right first port and right second port;
  an elongated piston having a left end cap and a right end cap freely axially slidable along the longitudinal axis of the valve body and configured to close the left second port or right second port depending on the position of the deflector plate;
  wherein when the deflector plate is positioned to divert fluid to the right, the right first port is open and the right cap closes the right second port and the left first port and left second port are open and when the deflector plate is positioned to direct flow to the left, the left second port is closed and the left first port is open and both the right first port and right second port are open;
moving the deflector plate in the valve to the filtration mode and directing fluid from the pump to the inlet port of the valve so that the fluid is directed to the first right port into the filter and out of the filter into the valve through the first left port and out of the valve through the left second port and back into the fluid source and wherein when backwash of the filter is desired the deflector plate is moved so that fluid entering the valve is directed out of first left port into the other side of the filter and travels through the filter collecting debris trapped in the filter and travels out of the filter into the valve at the first right port and is directed to the waste stream out of the valve through the second right port.

In still a further aspect of the invention a timing device for a valve or other mechanically actuable device is provided comprising:

a housing;
pressure detecting means;
resilient means which compresses or expands depending on the pressure in the housing;
a gear member in communication with the resilient means which moves outwardly of the housing a predetermined distance when a predetermined pressure is exceeded; and
pressure control means to control pressure in the housing;
wherein, during operation, as the pressure increases in the housing, the resilient means is compressed, and, when a predetermined pressure is exceeded, the gear member is forced out of the housing a predetermined distance to exert a mechanical force to actuate a valve after which the pressure control means decreases the pressure in the housing over a predetermined period expanding the resilient means and forcing the gear member back into the housing resetting the valve to its initial low pressure position.

A preferred timing device comprises an automatic timing device for a valve comprising:

a housing having a first opening for a pressure detection means, a second opening for an elongated axially slidable rack gear member to slide inwardly and outwardly of the housing, an opening in the housing adjacent the slidable rack gear member to accommodate springs and ball bearings which springs urge the ball bearings against the surface of the slidable rack gear member;
resilient means in the housing which compresses or expands depending on the pressure in the housing;
an elongated axially slidable rack gear member having a bore therethrough to accommodate a piston and indents in the surface of the gear member to mate with the ball bearings, a first open area and a second open area separated by a cross member, the second open area having a rack gear to accommodate a pinion gear;
a piston attached at one end to the resilient means and the other end extending through the bore of the axially slidable gear member and terminates in a cap larger than the bore;
spring means connected at one end to the resilient means and to the other end urging against the upper end of the axial slidable rack gear member;
wherein, in operation, starting with a low pressure in the housing, as the pressure detecting means senses an increase in pressure, the resilient means is compressed depending on the amount of pressure sensed with the spring means also being compressed and the rod extending partly into the first open area and, when a predetermined pressure is exceeded, the resistance force of the ball bearings is exceeded and the axially slidable rack gear member is forced outwardly from the housing and turns the pinion gear of the valve actuating the valve, and, as the pressure in the housing decreases, the resilient means expands forcing the piston and communicating rack gear inwardly to the housing and returning the valve to its initial position.

In another aspect of the invention a valve assembly including an automatic timing device is provided comprising:

a valve assembly comprising:

an elongated valve body having a longitudinal axis and curved central portion, an inlet port in the central portion, a left first port, a left second port, a right first port and a right second port, the left first port and right first port being opposed;

a rotatable deflector plate in the central portion of the valve body having a rotating vertical axis perpendicular to the longitudinal axis of the valve body and the periphery of the deflector plate is in fluid light communication with the wall of the curved central portion, the deflector plate rotatable to direct a fluid entering the inlet port toward the left first port and left second port or to the right first port and right second port;

an elongated piston having a left end cap and a right end cap freely axially slidable along the longitudinal axis of the valve body and configured to close the left second port or right second port depending on the position of the deflector plate;

wherein when the deflector plate is positioned to divert fluid to the right, the right first port is open and the right cap closes the right second port and the left first port and left second port are open and when the deflector plate is positioned to direct flow to the left, the left second port is closed and the left first port is open and both the right first port and right second port are open;

a timing device for the valve comprising:
  a housing;
  pressure detecting means;
  resilient means which compresses or expands depending on the pressure in the housing;
  a gear member in communication with the resilient means which moves outwardly of the housing a predetermined distance when a predetermined pressure is exceeded; and
  pressure control means to control pressure in the housing;
  wherein, during operation, as the pressure increases in the housing, the resilient means is compressed, and, when a predetermined pressure is exceeded, the gear member is forced out of the housing a predetermined distance to exert a mechanical force to rotate the deflector plate of the valve after which the pressure control means decreases the pressure in the housing over a predetermined period expanding the resilient means and forcing the gear member back into the housing rotating the deflector plate of the valve to its initial low pressure position.

BRIEF DESCRIPTION OF THE DRAWINGS

The features of the invention believed to be novel and the elements characteristic of the invention are set forth with particularity in the appended claims. the figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–13 of the drawings in which like numerals refer to like features of the invention.

Figure 1:
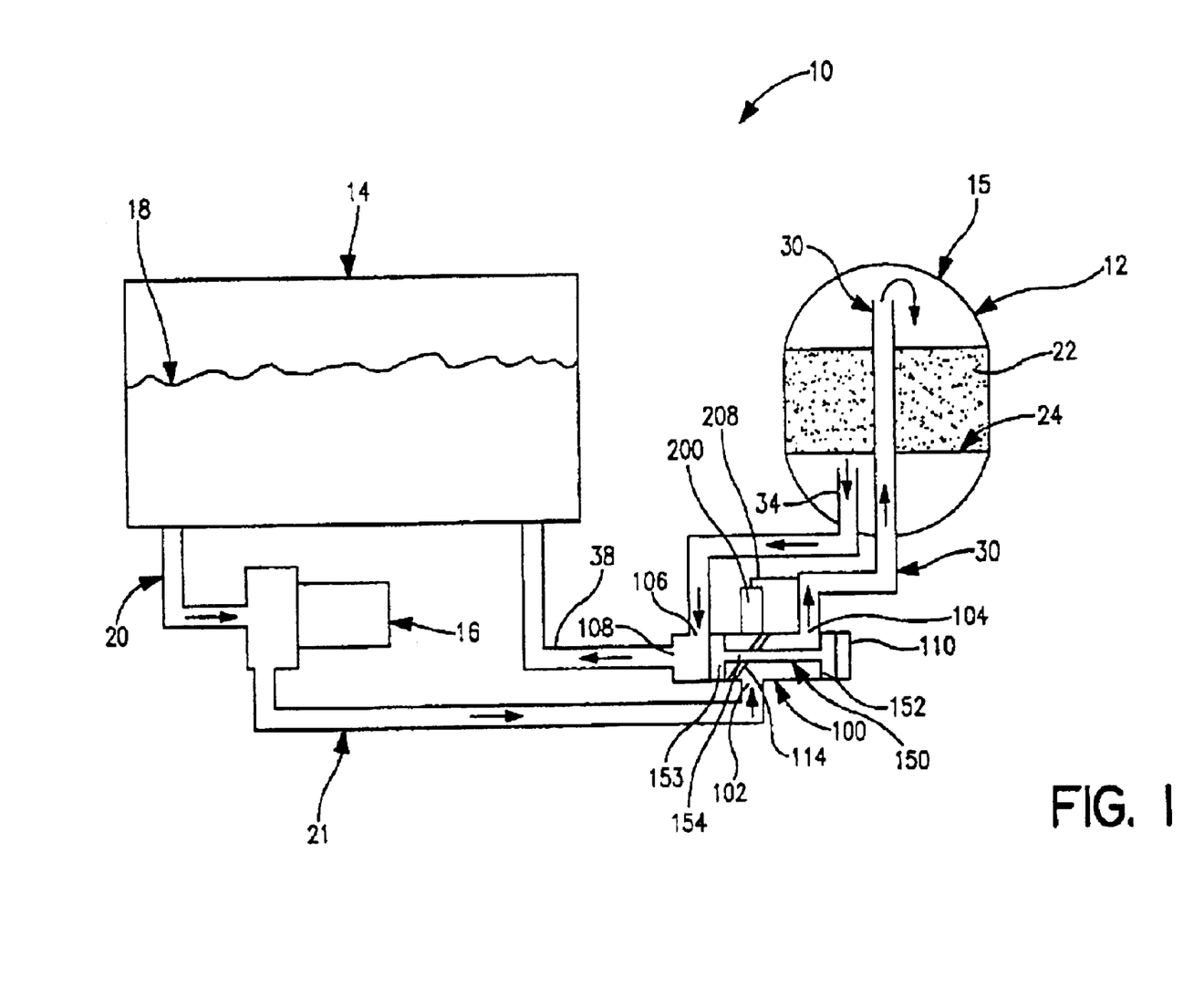
FIG. 1 is a schematic diagram showing a swimming pool filtration system in the filtration mode including an automatic five-port valve apparatus of the present invention, a pool, a pump, and a filtering device.

Referring to FIG. 1, operation of a swimming pool filtration and backwash system using the valve and timing device of the invention may be demonstrated. The schematic diagram shows a swimming pool filtration system in general as numeral 10. The system comprises a pool 14 containing a fluid typically water 18, a pump 16, a filtering device 12 and the valve of the invention shown as numeral 100 and a timing device 200. The filtering device 12 comprises a housing 15 having a bed of sand 22 therein supported on a porous grid 24.

In operation, water 18 from pool 14 is fed to pump 16 through line 20. Water is pumped from pump 16 through line 21 into valve 100. The water enters the valve 100 at input port 102 and exits the valve at first right port 104 through line 30 into filter housing 15. The water exiting through line 30 filters through sand bed 22 and is collected in line 34 which returns the water to valve 100 through first left port 106. The filtered water then flows out of valve 100 through second left valve port 108 through line 38 back into the pool 14.

As can be seen from the schematic view, valve 100 comprises an elongated valve body having a central inlet port 102, a first right port 104, a second right port 110, a first left port 106 and a second left port 108. The valve contains a rotatable fluid deflector plate 114 at the input port 102 and, as will be discussed further hereinbelow, the fluid deflector plate moves in a 90° arc to a right angled filtering position as shown and to a left angled backwash position as shown hereinbelow in FIG. 1A. The fluid deflector plate 114 is moved in the valve body preferably by a fluid pressure timing device 200 as shown in more detail hereinbelow.

The fluid pressure timing device 200 is automatically controlled by fluid pressure in the system and a pressure sensing line 208 is shown leading from the timing device 200 to line 30. In operation, fluid flowing through line 30 would exert a pressure force through line 208 and timing device 200 so that the pressure in line 30 is essentially the same pressure as in timing device 200. It is the pressure in line 30 which activates timing device 200 to move the fluid deflector 114 from or to a right angled filtering position and/or a left angled backwash position. It will be appreciated by those skilled in the art that the pressure in timing device 200 is dependent upon the location of the pressure sensing line 208 so that if the sensing line were, for example, at the top of housing 15, the pressure would be slightly lower because of the pressure drop in the system. However, the location of the sensing line 208 is correlated with the mechanism in the timing device 200 to provide actuation of the timing device when a particular predetermined pressure is achieved. As discussed hereinbelow, as the debris builds up on the surface of sand bed 22, pressure in the system which includes the pressure in line 30 and sensing line 208, increases, and it is this increase in pressure which is detected by timing device 200 which will actuate the valve and move the fluid deflector plate 114 to a backwash position when a particular predetermined pressure is exceeded.

Valve 100 also contains a freely axial slidable double-headed piston shown generally as 150. The piston 150 comprises a rod 154 capped at the right end by cap 152 and at the left end by cap 153. As will be also discussed hereinbelow, the piston 150 is moved axially in the valve by the pressure of the fluid in the system toward the right or the left in valve body 100 by the direction of the flow of the water in the valve. As shown in the figure, piston 150 is positioned to the right with cap 152 blocking second right port 110. Accordingly, water flowing into valve 100 through inlet port 102 will be diverted to the right by deflector plate 114 out through first port into filter 12 but will be prevented from flowing out second right port 110 because of cap 152. Inlet water does not flow in the valve to the left because of the deflector plate 114.

Thus, in this filtering operation as shown, water flowing from the pool through line 21 into inlet 102 of valve 100 is diverted through line 30 into filter 12 and flows through sand bed 22 and out the filter 12 through line 34 into valve 100 through first left port 106 and out second left port 108 through line 38 back into the pool.

Figure 1A:
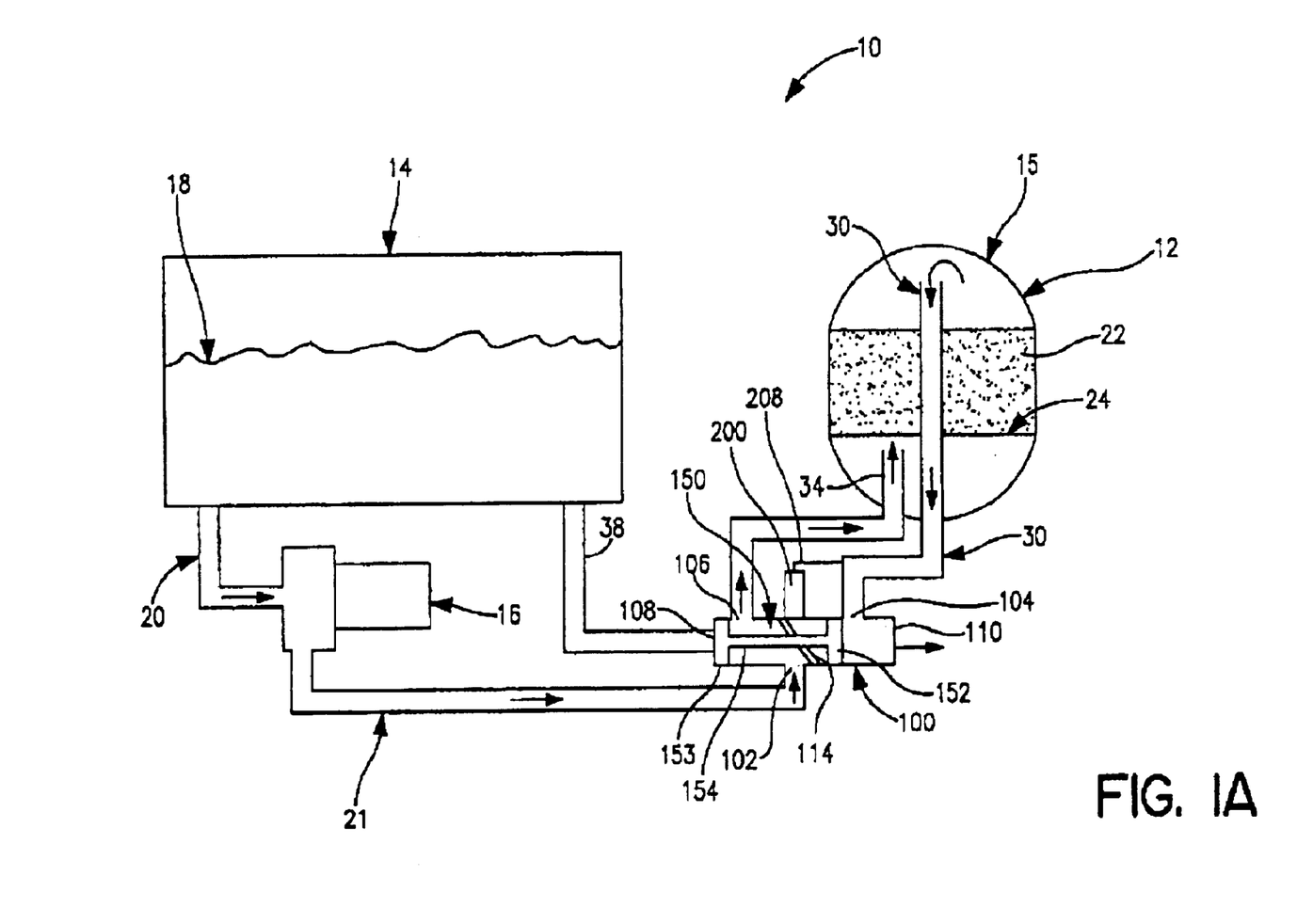
FIG. 1A is a schematic diagram showing the swimming pool filtration system of FIG. 1 in the backwash mode.

In the backwash system as shown in FIG. 1A, fluid deflector plate 114 is now angled to the left and incoming water through inlet port 102 would move the piston 150 to the left with cap 153 blocking second left port 108. Inlet water is blocked by deflector plate 114 from entering first right port 104 and second right port 110 which are both now open since cap 152 is proximate deflector palte 114. Accordingly, the water will be diverted from inlet port 102 to the left by fluid deflector plate 114 out first left port 106 through line 34 into filter 12 and flow through sand bed 22 and exit the filter with backwashed debris through line 30. Water flowing through line 30 now enters valve 100 through first right port 104 and exits the system through second right port 110 to waste. The water exiting the system in the backwash operation will contain debris and other material which collected on or in the sand bed 22 causing an increase in pressure in the system which activated timing device 200.

The fluid deflector plate 114 was moved automatically to the angled left backwash position by timing device 200 because the pressure in sensing line 208 exceeded a certain predetermined pressure which actuated the timing device 200 to turn the plate 114 from the right angled filtering position to the left angled backwash position.

In the backwash operation shown in FIG. 1A, fluid pressure in line 30 is now lower than the pressure in timing device 200. The high pressure water still in pressure sensing line 208 and timing device 200 will now flow out of timing device 200 into line 30 due to the pressure differential gradually lowering the pressure in the timing device. As the pressure decreases, deflector plate 114 is gradually turned to the right angled filtering position as shown in FIG. 1 to its initial position. As this occurs the slidable piston 150 moves to the right as shown in FIG. 1 because of the force of the water entering inlet port 102 and the filtering operation will continue as shown in FIG. 1. This will continue until the pressure builds again in the filter 12 because of debris and the increase in pressure in line 30, sensing line 208 and timing device 200 will then actuate timing device 200 to turn fluid deflector plate quickly to the left to start a backwash operation as shown in FIG. 1A. Therefore both the filtering operation and the backwash operation continue automatically without the use of any electronic devices or any other manual intervention.

Figure 2:
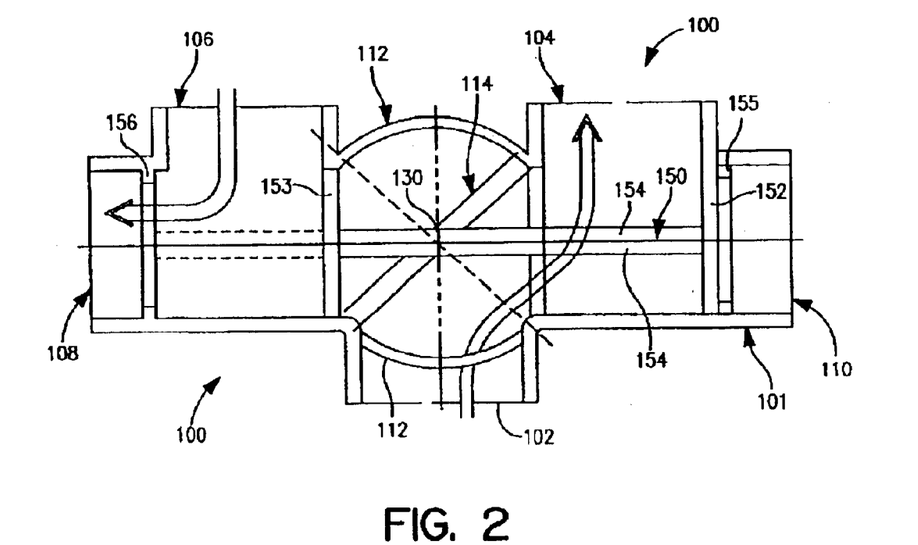
FIG. 2 is a cross-sectional plan view of the automatic five-port valve apparatus of the invention in the filtration mode showing the valve body, rotatable fluid deflector plate and slidable double-headed piston.

Referring now to FIG. 2, a cross-sectional plan view of valve 100 of the invention is shown in the filtration mode. Thus, water as shown by the arrows flows into inlet port 102 and is diverted to the right by fluid deflector 114 and passes out of the valve at first right port 104. The fluid in this filtering mode will go to the filter. The fluid returns from the filter and enters the valve at first left port 106 and exits the valve at second left port 108 and is directed back to the pool. Deflector plate 114 travels in an arc as defined by curve 112 of the valve and the periphery of the deflector plate is in fluid tight contact with the valve housing to prevent water from leaking around the deflector plate. The slidable piston 150 comprising an elongated rod 154 with a right end cap 152 and a left end cap 153 is shown moved to the right by the force of the water with right cap 152 urged against valve stop 155. This closes second right port 110 and leaves open first right port 104. The water cannot pass to the left because of the plate 114 and cap 153 and accordingly first left port 106 and second left port 108 are open for the return water. Cap 153 is shown positioned adjacent first left port 106.

Figure 3:
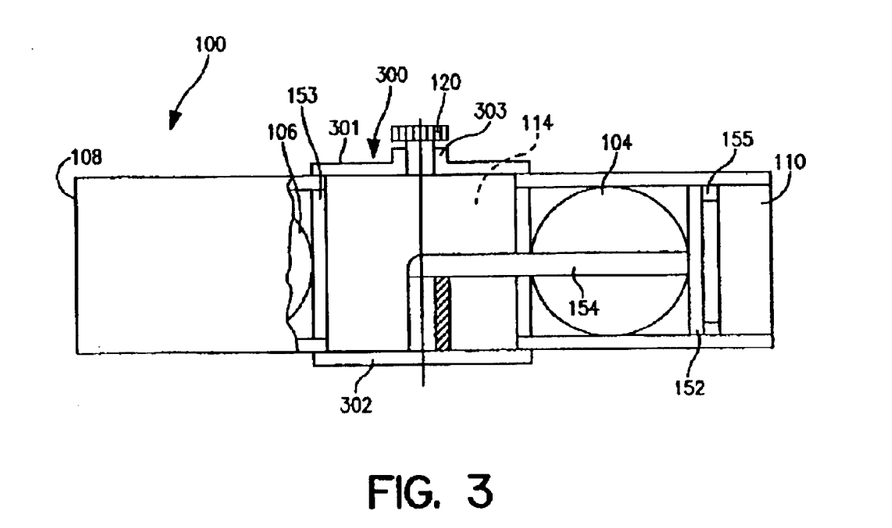
FIG. 3 is a partial cross-sectional side view of the automatic valve apparatus shown in FIG. 2.

FIG. 3 shows a side view of FIG. 2. Pinion gear 120 is shown at the top of the central portion of valve 100 and is connected to plate 114 so that when the pinion gear is turned plate 114 also turns in the arc of curve 112 as will be more fully described hereinbelow.

Figure 4:
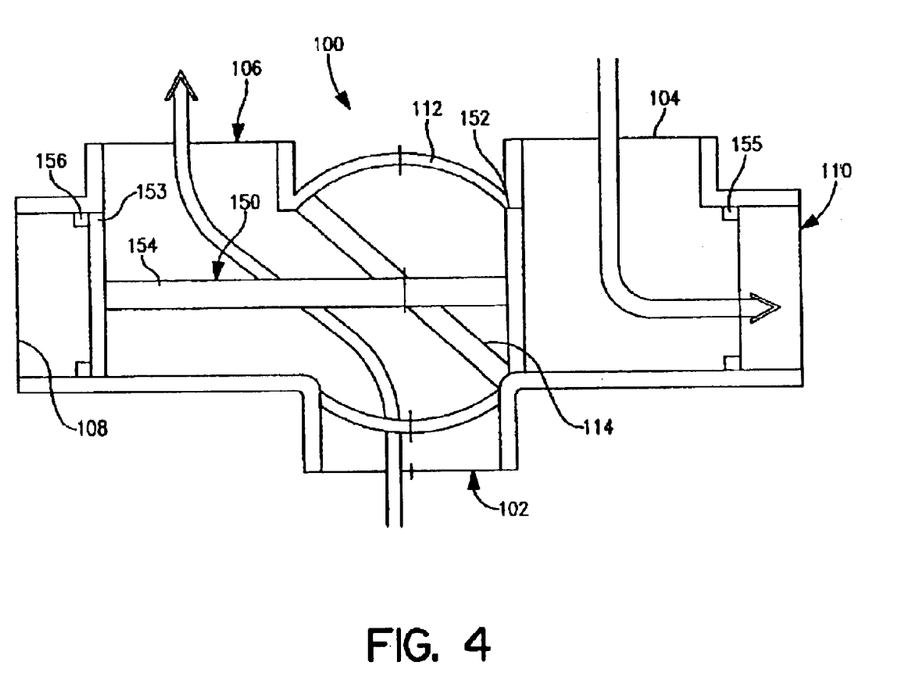
FIG. 4 is a cross-sectional plan view of the automatic five-port valve apparatus of the invention in the backwash mode.

Referring now to FIG. 4, this figure shows the valve 100 of the invention in the backwash mode. Thus, deflector plate 114 is shown angled to the left so that water entering input port 102 is diverted to the left and out first left port 106. This flow goes into the porous grid portion of the filter and backwashes the sand. Backwash water would then flow out of the filter into valve 100 through first right port 104 and out second right port 110 to waste. Double headed piston 150 is shown moved to the left by the pressure of water entering the valve so that left cap 153 is stopped by stop 156 closing second left port 108. Right cap 152 is positioned adjacent first right port 104. The position of piston 150 opens first right port 104 and second right port 110 so that backwash water flowing from the filter enters first right port 104 and exits the valve at second right port 110.

As will be further detailed below, the backwash mode continues until the automatic timing device 200 turns plate 114 to the right for the filtration mode as shown in FIGS. 1 and 2.

Figure 5:
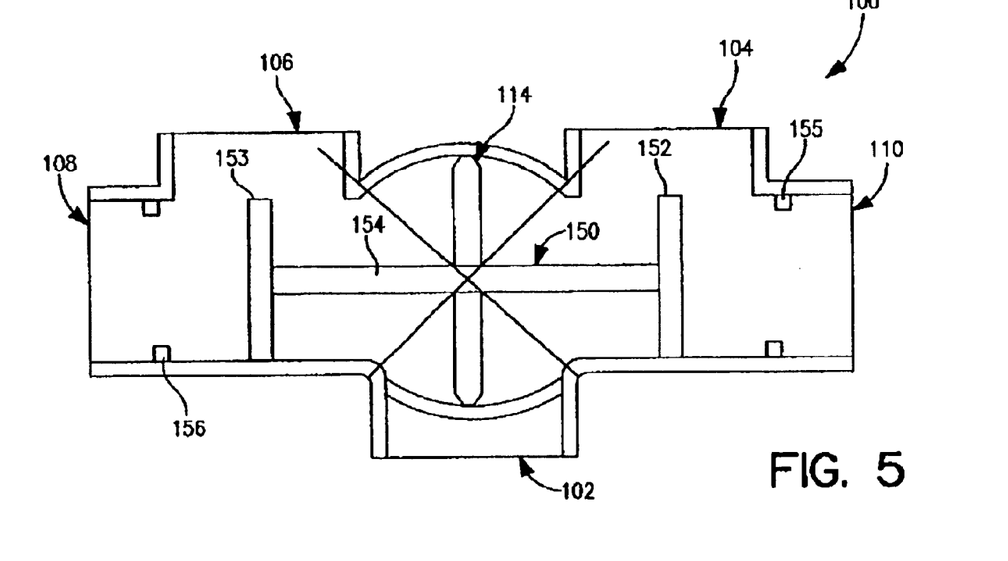
FIG. 5 is a cross-sectional plan view of the automatic five-port valve apparatus of the invention showing the rotatable fluid deflector plate at its midway point.

For description purposes, FIG. 5 is shown demonstrating the midway position of deflector plate 114 and slidable piston 150. Caps 153 and 152 of piston 150 can be seen intermediate first left port 106 and first right port 104. This position of the deflector plate 114 and piston 150 would not be used for either the filtration mode or the backwash mode and is merely an intermediate position during turning of the deflection deflector plate 114 by the automatic timing device to the filtering mode or backwash mode.

Figure 6:
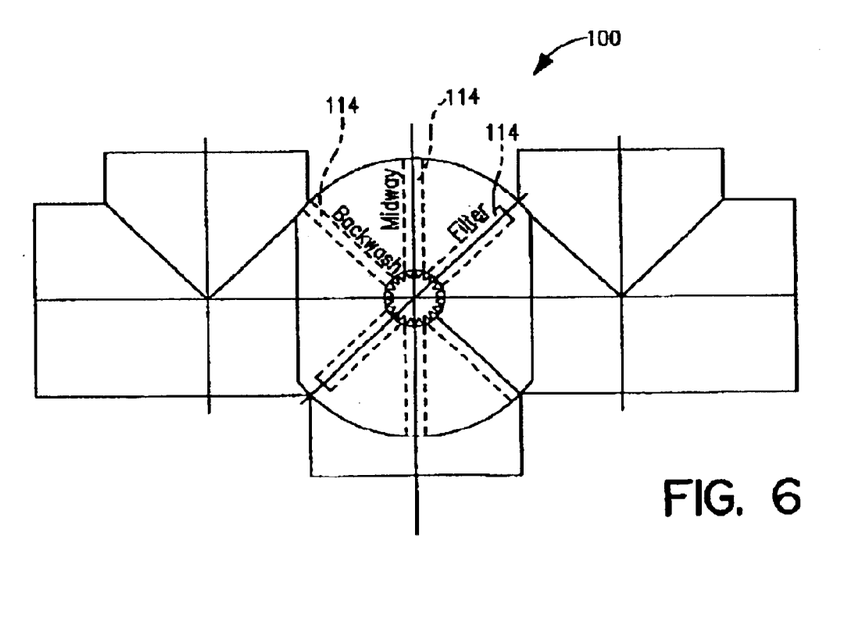
FIG. 6 is a cross-sectional plan view of the automatic five-port valve apparatus of the invention showing three positions of the rotatable fluid deflector plate.

FIG. 6 shows a plan view of valve 100 of the invention showing the position of deflector plate 114 in the filter mode, backwash mode and mid position.

FIGS. 7–11 show, in sequence, operation of the timing device 200 of the invention to control the position of the plate 114 in valve 100. Timing device 200 comprises a housing 202 having a first opening 201. An orifice plate 206 is positioned in first through opening 201 to provide an automatic timing mechanism for the timing device as will be more fully discussed hereinbelow. The other end of the housing has a base 230 having transverse openings 231 to support springs 220 which urge against ball bearings 219 and a second through opening 250 for movement of a gear member inwardly and outwardly of the housing. A bellows 204 is contained in the housing with a rod 210 connected at one end of the bellows. The other end of the rod 210 has a cap 210a. A spring 222 surrounds rod 210 and contacts one end of the bellows and one end of an elongated gear structure shown as 212. The elongated gear structure has an axial through opening to accommodate the rod 210 and has open areas 217 and 218 with a cross member 213 and an end member 215. The gear structure moves inwardly and outwardly of housing 202 through second housing through opening 250. Open area 218 has a rack gear 214 which communicates with pinion gear 120. Deflector plate 114 is connected to a central axis 130 of the pinion gear 120 and the deflector plate is shown angled to the right in the filtration mode as shown in FIGS. 1 and 2.

Figure 7:
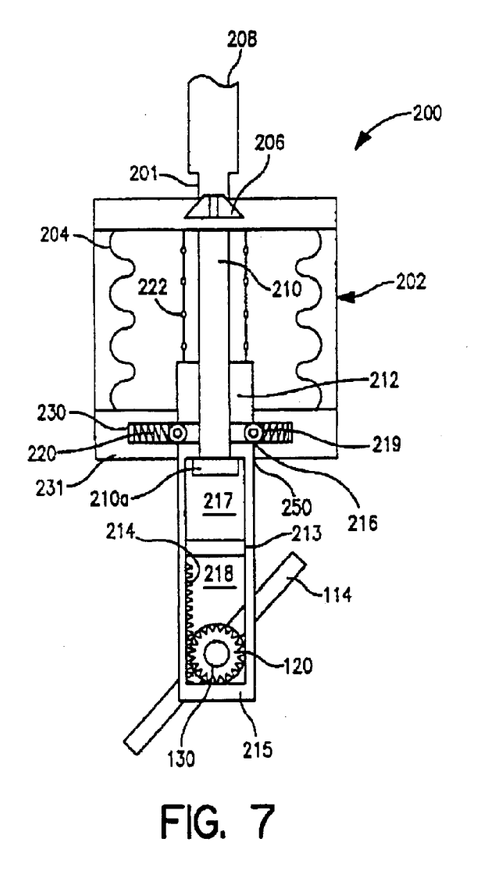
FIGS. 7–11 are cross-sectional plan views of a fluid pressure timing device showing, in sequence, compression of the bellows and actuation of the device to turn the rotatable fluid deflector plate of the valve of the invention.

At the opening 201 of timing device 200 is a pressure sensing line 208 which is connected to piping in the filtration system so that fluid in the system would be directed to or out of housing 202 through orifice plate 206 by the differential pressure between the system pressure and the pressure in the housing. During operation of the valve in the filtering system, fluid in the system would exert a pressure force on timing device 200 through sensing line 208 and the pressure of the fluid in the timing device 200 would be essentially the same as in the system where sensing line 208 is connected. Accordingly, as pressure in the system increases due to the accommodation of debris on the filter, the pressure in the timing device would also increase.

Figure 8:
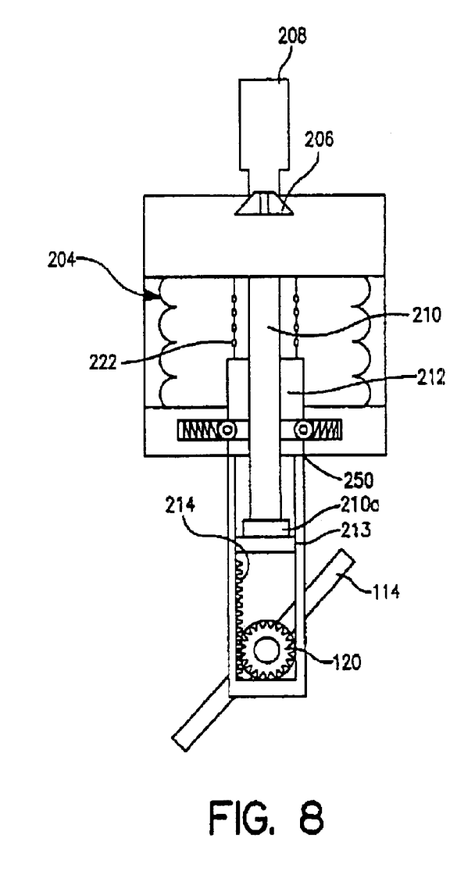

Referring now to FIG. 8, increasing pressure in the system increases the pressure in timing device 200 so that bellows 204 is shown partly compressed. This also compresses spring 222 and forces rod 210 outward from the housing so that cap 210a is shown proximate cross member 213. As can be seen there has been no turning of pinion gear 120 and the deflector plate 114 is still angled to the right.

Figure 9:
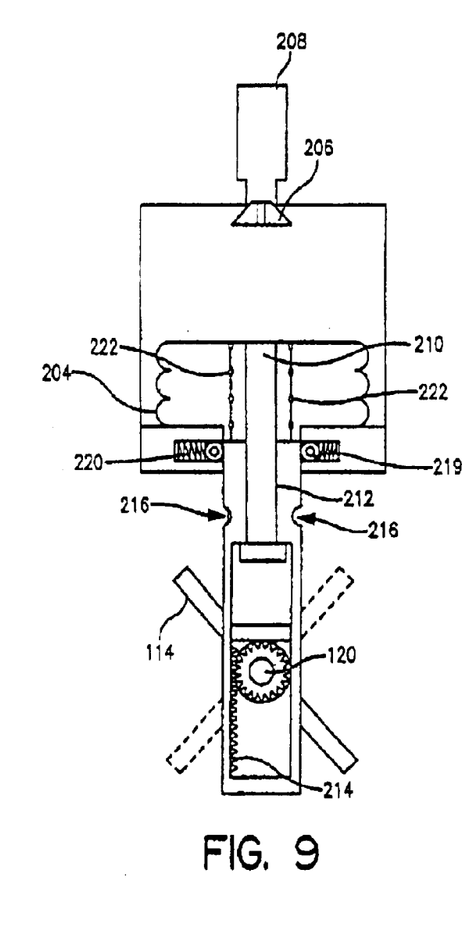

Referring now to FIG. 9, the pressure now in the timing device has exceeded a set predetermined pressure and bellows 204 is shown further compressed and elongated gear structure 212 has been forced quickly outward from the housing by the pressure in the housing and the action of the spring. Gear structure 212 has indents 216 which mate with the ball bearings 219 to provide further control of actuation of the timing device because when the system pressure exceeds a predetermined level, the resistance of the mated ball bearings is overcome and gear structure extends its full stroke since there is now much less resistance to the gear structure movement. Thus, when pressure in the housing exceeds the predetermined set pressure, gear structure 212 is moved outwardly from the housing turning pinion gear 120 in gear rack 214 and turning deflector plate 114 quickly to the left. The deflector plate 114 is now in the backwash mode and water entering the valve will be diverted to the left as shown in FIG. 1A.

In the backwash mode, pressure in the system to which the sensing line 208 is connected is now at a lower pressure and water still under a higher pressure in the timing device 200 will slowly exit the timing device through orifice plate 206 and flow through sensing line 208 back into the system because of the pressure differential. The orifice plate 206 will restrict the flow of water from the timing device thus providing the desired time for the system to be in backwash mode. The size of the orifice plate can be adjusted to adjust the timing of the backwash mode. The deflector plate 114 will gradually turn as shown as the pressure is gradually decreasing in the housing. This is to be contrasted with the sudden full extension movement of gear structure 212 and deflector plate 114 when the pressure in the housing exceeds the predetermined pressure the resistance of the ball bearings is overcome.

Figure 10:
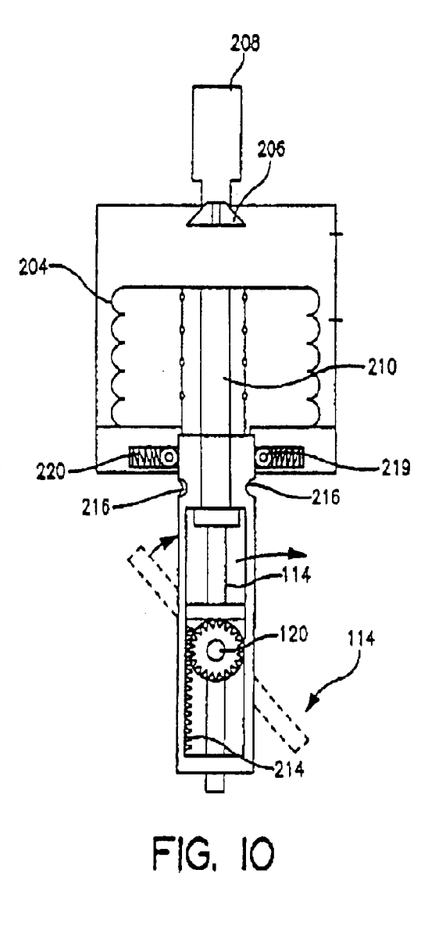

FIG. 10 shows a decreased pressure in housing 202 so that the bellows 204 is expanding turning the deflector plate 114 from a left angled position shown in phantom to an intermediate position.

Figure 11:
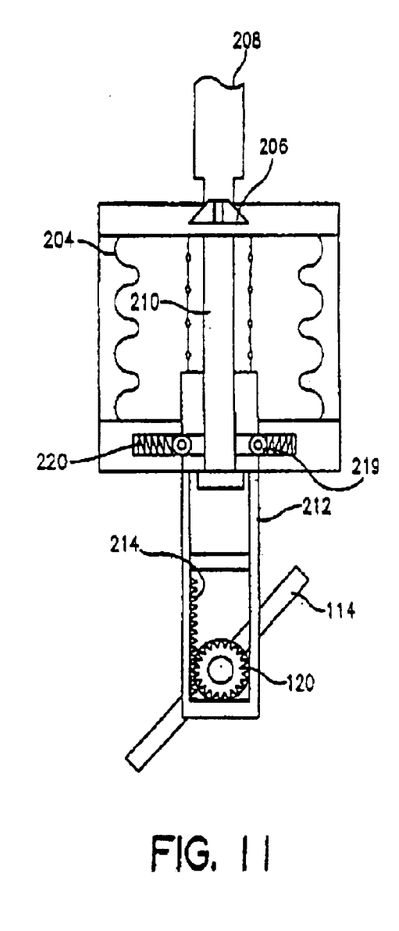

FIG. 11 shows the timing device 200 in its original configuration in the filtration mode with deflector plate 114 angled to the right for the filtration mode and the bellows 204 in its expanded position. FIG. 7 is thus the same as FIG. 11 and the system is now in a filtration mode and will continue in this mode until the pressure increases in the system again due to the accommodation of debris in the filter and the timing device 200 actuated to move the deflector plate to the backwash mode. The filtration-backwash control system will continue automatically without any manual intervention or electrical devices.

Figure 12:
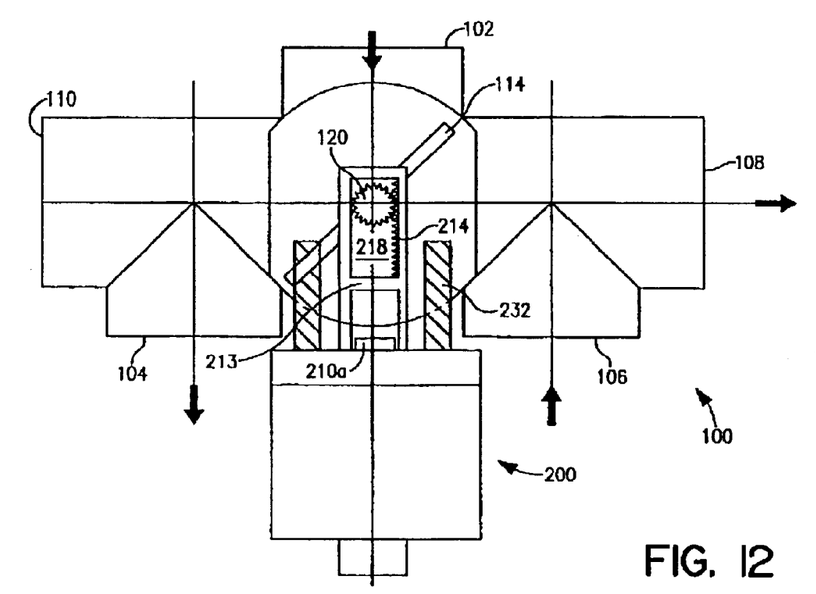
FIG. 12 shows a plan view of the valve of the invention including a timing device attached thereto.

FIG. 12 shows a plan view of valve 100 of the invention having a timing device 200 attached thereto. Open area 218 of the rack 214 is positioned over pinion gear 120 and mated thereto and the timing device is secured to the valve body by structural members 232.

Figure 13:
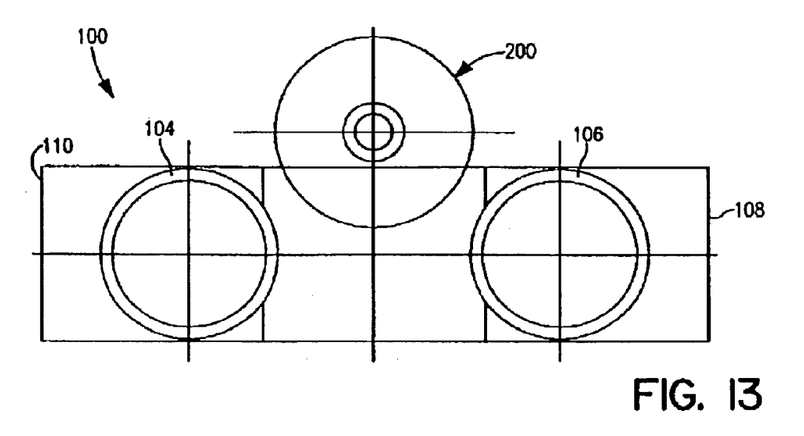
FIG. 13 shows a side elevational view of FIG. 12.

FIG. 13 shows a side elevational view of the valve 100 and timing device 200 of the invention.

The elongated valve 100 may be constructed in a variety of ways and the preferred valve structure is shown in FIGS. 2 and 3. Thus, the central portion 300 is curved in an arc 112 to accommodate movement of the rectangular rotating deflector plate 114. A cylinder is preferred and shown having a flat top 301 and a flat bottom 302. A bushing 303 supports a pinion gear 120 which is connected to the vertical axis of the rotating deflector plate. Inlet port 102 is preferably transverse to the vertical plane of rotating deflector plate 114 so that the water entering the valve is directed at the surface of the deflector plate. Intersecting cylinder 300 is a right valve portion having a first right port 104 and a second right port 110. A stop 155 is in port 110. Also intersecting cylinder 300 is a left valve portion having a first left port 106 and a second left port 108. A stop 156 is in port 108. A rotatable fluid deflector plate 114 is disposed in central portion 300 and rotates about a vertical axis 130. An axially slidable double headed piston 150 freely moves axially in the valve body and right cap 152 and left cap 153 block opposed second right port 110 and second left port 108, respectively, depending on whether the valve is in the filtering mode or backwash mode.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A valve assembly comprising:
   an elongated valve body having a longitudinal axis and curved central portion, an inlet port in the central portion, a left first port, a left second port, a right first port and a right second port, the left first port and right first port being opposed;
   a rotatable deflector plate in the central portion of the valve body having a rotating vertical axis perpendicular to the longitudinal axis of the valve body and the periphery of the deflector plate is in fluid tight communication with the wall of the curved central portion, the deflector plate rotatable to direct a fluid entering the inlet port toward the left first port and left second port or to the right first port and right second port;
   an elongated piston having a left end cap and a right end cap freely axially slidable along the longitudinal axis of the valve body and configured to close the left second port or right second port depending on the position of the deflector plate;
   wherein when the deflector plate is positioned to divert fluid to the right, the right first port is open and the right cap closes the right second port and the left first port and left second port are open and when the deflector plate is positioned to direct flow to the left, the left second port is closed and the left first port is open and both the right first port and right second port are open.

2. The valve of claim 1 wherein the central portion is part of a cylinder and the deflector plate is rectangular.

3. The valve of claim 2 wherein the right second port and left second port have stops to control movement of the elongated piston.

4. A filtration system comprising:
   a fluid source;
   a pump;
   a filter;
   a valve comprising:
      an elongated valve body having a longitudinal axis and curved central portion, an inlet port in the central portion, a left first port, a left second port, a right first port and a right second port, the left first port and right first port being opposed;
      a rotatable deflector plate in the central portion of the valve body having a rotating vertical axis perpendicular to the longitudinal axis of the valve body and the periphery of the deflector plate is in fluid tight communication with the wall of the curved central portion, the deflector plate rotatable to direct a fluid entering the inlet port toward the left first port and left second port or to the right first port and right second port;
      an elongated piston having a left end cap and a right end cap freely axially slidable along the longitudinal axis of the valve body and configured to close the left second port or right second port depending on the position of the deflector plate;
   wherein when the deflector plate is positioned to divert fluid to the right, the right first port is open and the right cap closes the right second port and the left first port and left second port are open and when the deflector plate is positioned to direct flow to the left, the left second port is closed and the left first port is open and both the right first port and right second port are open;
   wherein when filtering of the fluid is desired, fluid entering the inlet port of the valve is directed to the filter through the first right port and from the filter back to the water source through the first left port and second left port and, in the backwash mode, the deflector plate is rotated and the fluid is directed to the other side of the filter through the first left port and out from the filter into the valve through the first right port and out to waste through the second right port.

5. The filtration system of claim 4 wherein the central portion of the valve is part of a cylinder and the deflector plate is rectangular.

6. The filtration system of claim 5 wherein the right second port and left second port have stops to control movement of the elongated piston.

7. A method of filtering a fluid through a filtration system comprising the steps of:
   providing a fluid source to be filtered;
   providing a pump;
   providing a filter;
   providing a valve comprising:
      an elongated valve body having a longitudinal axis and curved central portion, an inlet port in the central portion, a left first port, a left second port, a right first port and a right second port, the left first port and right first port being opposed;
      a rotatable deflector plate in the central portion of the valve body having a vertical rotating axis perpendicular to the longitudinal axis of the valve body and the periphery of the deflector plate is in fluid tight communication with the wall of the curved central portion, the deflector plate rotatable to direct a fluid entering the inlet port toward the left first port and left second port or to the right first port and right second port;
      an elongated piston having a left end cap and a right end cap freely axially slidable along the longitudinal axis of the valve body and configured to close the left second port or right second port depending on the position of the deflector plate;
   wherein when the deflector plate is positioned to divert fluid to the right, the right first port is open and the right cap closes the right second port and the left first port and left second port are open and when the deflector plate is positioned to direct flow to the left, the left second port is closed and the left first port is open and both the right first port and right second port are open;
   moving the deflector plate in the valve to the filtration mode and directing fluid from the pump to the inlet port of the valve so that the fluid is directed to the first right port into the filter and out of the filter into the valve through the first left port and out of the valve through the left second port and back into the fluid source and wherein when backwash of the filter is desired the deflector plate is moved so that water entering the valve is directed out of first left port into the other side of the filter and travels through the filter collecting debris trapped in the filter and travels out of the filter into the valve at the first right port and is directed to the waste stream out of the valve through the second right port.

8. The method of claim 7 wherein the fluid source is a swimming pool.

9. The method of claim 8 wherein the filter is a sand bed.

10. A valve assembly including an automatic timing device comprising:

a valve assembly comprising:

an elongated valve body having a longitudinal axis and curved central portion, an inlet port in the central portion, a left first port, a left second port, a right first port and a right second port, the left first port and right first port being opposed;

a rotatable deflector plate in the central portion of the valve body having a rotating vertical axis perpendicular to the longitudinal axis of the valve body and the periphery of the deflector plate is in fluid tight communication with the wall of the curved central portion, the deflector plate rotatable to direct a fluid entering the inlet port toward the left first port and left second port or to the right first port and right second port;

an elongated piston having a left end cap and a right end cap freely axially slidable along the longitudinal axis of the valve body and configured to close the left second port or right second port depending on the position of the deflector plate;

wherein when the deflector plate is positioned to divert fluid to the right, the right first port is open and the right cap closes the right second port and the left first port and left second port are open and when the deflector plate is positioned to direct flow to the left, the left second port is closed and the left first port is open and both the right first port and right second port are open;

a timing device for the valve comprising:

a housing;

pressure detecting means;

resilient means which compresses or expands depending on the pressure in the housing;

a gear member in communication with the resilient means which moves outwardly of the housing a predetermined distance when a predetermined pressure is exceeded; and pressure control means to control pressure in the housing;

wherein, during operation, as the pressure increases in the housing, the resilient means is compressed, and, when a predetermined pressure is exceeded, the gear member is forced out of the housing a predetermined distance to exert a mechanical force to rotate the deflector plate of the valve after which the pressure control means decreases the pressure in the housing over a predetermined period expanding the resilient means and forcing the gear member back into the housing rotating the deflector plate of the valve to its initial low pressure position.

\* \* \* \* \*

UNITED STATES PATENT AND TRADEMARK OFFICE
CERTIFICATE OF CORRECTION

PATENT NO. : 6,878,293 B1
DATED : April 12, 2005
INVENTOR(S) : Portyrata et al.

It is certified that error appears in the above-identified patent and that said Letters Patent is hereby corrected as shown below:

Title page,
Item [56], References Cited, U.S. PATENT DOCUMENTS, U.S. Patent No. 2,858,024, issue date "12/1958" should be -- 10/1958 --.

Column 1,
Line 10, delete "wimming" and substitute therefor -- swimming --.
Line 64, after "type" insert -- of system is --.

Column 5,
Line 20, delete "light" and substitute therefor -- tight --.

Signed and Sealed this

Fifth Day of July, 2005

JON W. DUDAS
*Director of the United States Patent and Trademark Office*